(12) United States Patent
Mashimo

(10) Patent No.: US 7,599,262 B2
(45) Date of Patent: Oct. 6, 2009

(54) OPTICAL DISK APPARATUS

(75) Inventor: Akira Mashimo, Tokorozawa (JP)

(73) Assignee: TEAC Corporation, Tama-shi (JP)

( * ) Notice: Subject to any disclaimer, the term of this patent is extended or adjusted under 35 U.S.C. 154(b) by 527 days.

(21) Appl. No.: 11/493,462

(22) Filed: Jul. 25, 2006

(65) Prior Publication Data

US 2007/0025232 A1 Feb. 1, 2007

(30) Foreign Application Priority Data

Jul. 26, 2005 (JP) ............................. 2005-215279

(51) Int. Cl.
*G11B 7/00* (2006.01)

(52) U.S. Cl. ................ 369/47.19; 369/124.04

(58) Field of Classification Search ............ 369/124.04, 369/47.17, 47.22, 59.17, 59.18, 47.19, 47.28
See application file for complete search history.

(56) References Cited

U.S. PATENT DOCUMENTS

| | | | | |
|---|---|---|---|---|
| 6,999,391 | B2 * | 2/2006 | Heemskerk et al. | 369/53.34 |
| 7,099,244 | B2 * | 8/2006 | Nakata et al. | 369/47.19 |
| 7,123,557 | B2 * | 10/2006 | Heemskerk et al. | 369/47.19 |
| 7,414,932 | B2 * | 8/2008 | Kobayashi et al. | 369/47.22 |
| 7,433,277 | B2 * | 10/2008 | Nakata et al. | 369/44.13 |
| 2003/0165095 | A1 * | 9/2003 | Iimura et al. | 369/47.22 |
| 2004/0071228 | A1 | 4/2004 | Nakata et al. | |
| 2006/0256683 | A1 * | 11/2006 | Kobayashi et al. | 369/47.22 |
| 2008/0291794 | A1 * | 11/2008 | Kobayashi et al. | 369/47.22 |

FOREIGN PATENT DOCUMENTS

| | | |
|---|---|---|
| JP | 2002-342941 A | 11/2002 |
| JP | 2003-224613 A | 8/2003 |
| JP | 2004-134009 | 4/2004 |
| JP | 2004-310958 | 11/2004 |

OTHER PUBLICATIONS

Notice of Grounds for Rejection (JP) dated Mar. 18, 2008, issued in corresponding Japanese Application No. 2005-215279.

* cited by examiner

*Primary Examiner*—Thang V Tran
*Assistant Examiner*—Brenda Bernardi
(74) *Attorney, Agent, or Firm*—Christensen O'Connor Johnson Kindness PLLC

(57) ABSTRACT

To detect an MSK modulation mark from an MSK-modulated wobble signal without fail. A wobble signal of an optical disk is supplied to an address decoding circuit. The address decoding circuit performs exclusive-OR operation of a binarized wobble signal and a reference clock signal generated from the wobble signal by an PLL circuit, to thus compute a proportion of the exclusive-OR result assuming a value of one every half period of a reference clock signal. When there are continuously present a predetermined number of sections or more where a proportion becomes a predetermined threshold proportion or more, the sections are detected as an MSK modulation mark. A system controller changes the threshold proportion in accordance with crosstalk from an adjacent track.

11 Claims, 3 Drawing Sheets

OPTICAL DISK APPARATUS

PRIORITY INFORMATION

This application claims priority to Japanese Patent Application No. 2005-215279 filed on Jul. 26, 2005, which is incorporated herein by reference in its entirety.

BACKGROUND OF THE INVENTION

1. Technical Field

The present invention relates to an optical disk apparatus, and more particularly a technique for demodulating address information from an MSK-modulated wobble signal.

2. Related Art

A scheme for embedding address information about an optical disk into a wobble signal of the optical disk has hitherto been adopted. An MSK (Minimum Shift Keying) modulation scheme, a PSK (Phase-Shift Keying) modulation scheme, or an FSK (Frequency-Shift Keying) modulation scheme is used alone as the scheme. In addition to these schemes, there is also a system which uses both the MSK modulation scheme, as in the case of a Blu-ray disk, and an HMW (Harmonic Wave) modulation scheme. In the MSK modulation scheme, frequency modulation is effected while one frequency is taken as being identical with that of a reference carrier signal and another frequency is taken as being 1.5 times the frequency of the reference carrier signal. The reference carrier signal is assumed to have a signal waveform of $\cos(\omega t)$, code data "0" assumes a signal waveform of $\cos(\omega t)$ or an inverted signal waveform of $-\cos(\omega t)$, and code data "1" assumes a signal waveform of $\cos(1.5\omega t)$ or an inverted signal waveform of $-\cos(1.5\omega t)$. The MSK modulation mark is formed from a three-carrier period section having a signal waveform of $\cos(1.5\omega t)$, $-\cos(\omega t)$, and $-\cos(1.5\omega t)$.

Japanese Patent Laid-Open Publication No. 2004-310958 describes, at the time of demodulation of address information from an MSK-modulated wobble signal, multiplying the wobble signal by a carrier signal (a reference clock signal) generated from the wobble signal by a PLL circuit, to thus detect, as an MSK modulation mark, a point where a value determined by adding up multiplication results at every carrier period becomes negative. The Patent Publication also provides a description of inputting a multiplication result to a low-pass filter, to thus detect, as an MSK modulation mark, a point where a value output from the low-pass filter becomes negative.

As mentioned above, the MSK modulation mark can be detected by the wobble signal and the reference clock signal, and easy, reliable detection of a modulation mark is desired. In association with an increase in the density of an optical disk, the influence of crosstalk from an adjacent track cannot be ignored. Occurrence of shift of the phase of a wobble signal attributable to crosstalk is also assumed. Therefore, reliable detection of an MSK modulation mark without being affected by crosstalk is also required.

SUMMARY OF THE INVENTION

The present invention provides an apparatus capable of detecting an MSK-modulation portion (an MSK modulation mark) from an MSK-modulated wobble signal without fail.

The present invention provides an optical disk apparatus for demodulating an address by detecting an MSK-modulated portion from an MSK-modulated wobble signal, the apparatus comprising:

reproduction means for reproducing the wobble signal;

binarization means for binarizing the wobble signal;

operation means for performing exclusive-OR operation of the binarized wobble signal and a reference clock signal;

extraction means for comparing a proportion of the exclusive-OR value achieved in a half period of the reference clock signal assuming a value of one with a predetermined threshold proportion, to thus extract continuous sections where the proportion becomes equal to or greater than the predetermined threshold proportion; and detection means for detecting the continuous sections as the MSK-modulated portion when the continuous sections correspond to a predetermined number of sections or more. In one mode of the present invention, the optical disk drive has means for changing at least either the predetermined threshold proportion or the predetermined number of sections when crosstalk originating from an adjacent track is superimposed on the wobble signal.

The invention will be more clearly comprehended by reference to the embodiments provided below. However, the scope of the invention is not limited to these embodiments.

BRIEF DESCRIPTION OF THE DRAWINGS

Preferred embodiments of the present invention will be described in detail by reference to the following figures, wherein.

DETAILED DESCRIPTION OF THE PREFERRED EMBODIMENTS

An embodiment of the present invention will be described hereinbelow by reference to the drawings.

Figure 1:
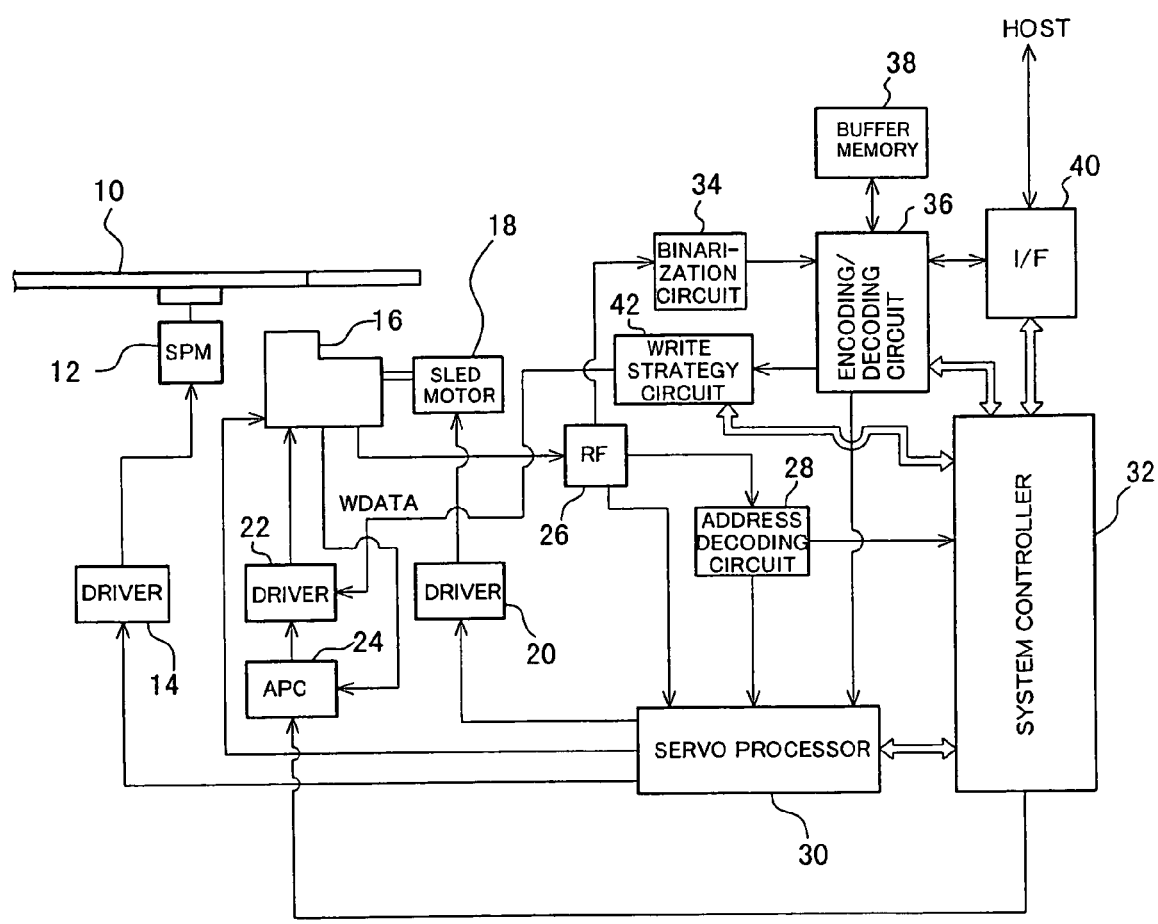
FIG. 1 is a block diagram showing the configuration of an optical disk apparatus.

FIG. 1 shows a block diagram of an optical disk apparatus according to the embodiment of the present invention. An optical disk 10 is rotationally driven by a spindle motor (SPM) 12. The spindle motor SPM 12 is driven by a driver 14, and the driver 14 is servo-controlled by a servo processor 30 so as to attain a desired rotational speed. One example of the optical disk 10 is a Blu-ray disk.

An optical pickup 16 includes a laser diode (LD) for radiating a laser beam onto the optical disk 10, and a photodetector (PD) which receives the light reflected from the optical disk 10 and converts the light into an electric signal. The optical pickup 16 is disposed opposite the optical disk 10. The optical pickup 16 is driven by a sled motor 18 in a radial direction of the optical disk 10, and the sled motor 18 is driven by a driver 20. Like the driver 14, the driver 20 is servo-controlled by the servo processor 30. The LD of the optical pickup 16 is driven by a driver 22, and the driver 22 is controlled by an auto power control circuit (APC) 24 such that a drive current assumes a desired value. The APC 24 controls the drive current of the driver 22 in such a way that optimum recording power selected through OPC (Optimum Power Control) performed in a test area (PCA) of the optical disk 10 is achieved. OPC is processing for recording test data in the PCA of the optical disk 10 while changing the recording power in a plurality of steps, evaluating the quality of a signal by reproducing the test data, and selecting recording power at which desired signal quality is attained. A β value, a γ value, the degree of modulation, a jitter, or the like is used as an index of signal quality.

When the data recorded in the optical disk 10 are reproduced, the laser beam of reproducing power is emitted from the LD of the optical pickup 16, and the resultant reflected light is converted into an electric signal by the PD. The thus-converted electrical signal is output. A reproduced signal output from the optical pickup 16 is supplied to an RF circuit 26. The RF circuit 26 generates a focus error signal and a tracking error signal from the reproduced signal, and supplies the signals to the servo processor 30. On the basis of the error signals, the servo processor 30 servo-controls the optical pickup 16, thereby maintaining the optical pickup 16 in an on-focus state and an on-track state.

The optical pickup 16 records/reproduces data in or from grooves of the optical disk 10. The grooves are formed in the optical disk 10 through wobbling. The RF circuit 26 supplies an address signal included in the reproduced signal to an address decoding circuit 28. The address decoding circuit 28 has a PLL circuit; generates a reference clock signal from a wobble signal to thus demodulate address data pertaining to the optical disk 10; and supplies the thus-demodulated address data to the servo processor 30 and a system controller 32.

The address data are formed from a monotone unit, a reference unit, SYNC units (SYNC0 to SYNC3 units), and data units (data 0, data 1). An MSK modulation mark is placed at the head of each unit. In an SYNC0 unit, an SYNC1 unit, an SYNC2 unit, and an SYNC3 unit, an MSK modulation mark is additionally placed at different positions other than the head. The address value is specified by a data unit. In relation to data0 and data1, an MSK modulation mark is placed at different positions other than the head, as well. The address value is represented by defining 0, 1 in the form of two types of sawtooth waveforms subsequent to the MSK modulation mark.

The RF circuit 26 supplies a reproduced RF signal to a binarizing circuit 34. The binarizing circuit 34 binarizes the reproduced signal, and supplies the resultant modulated signal to an encoding/decoding circuit 36. The encoding/decoding circuit 36 demodulates the binarized signal, and subjects the demodulated signal to error correction to thus produce reproduced data. The encoding/decoding circuit 36 outputs the reproduced data to a host, such as a personal computer, by way of an interface I/F 40. When the reproduced data are output to the host, the encoding/decoding circuit 36 temporarily stores the reproduced data in buffer memory 38 and later outputs the thus-stored data.

When data are recorded on the optical disk 10, data to be recorded which are output from the host are supplied to the encoding/decoding circuit 36 by way of the interface I/F 40. The encoding/decoding circuit 36 stores the data to be recorded in the buffer memory 38, encodes the data to be recorded, and supplies the thus-encoded data as modulated data to a write strategy circuit 42. The write strategy circuit 42 converts the modulated data into a multipulse (pulse train) in accordance with a predetermined recording strategy and supplies the converted data as record data to the driver 22. The recording strategy is formed from, e.g., a pulse width of a leading pulse in a multipulse train, a pulse width of a subsequent pulse, and a pulse duty. Since the recording strategy affects recording quality, the recording strategy is usually fixed to a certain optimum strategy. During OPC, the recording strategy may be concurrently set. The laser beam whose power has been modulated by the recording data is emitted from the LD of the optical pickup 16, whereby the data are recorded on the optical disk 10. After recording of the data, the optical pickup 16 reproduces the recorded data by radiating a laser beam of reproducing power, and supplies the reproduced data to the RF circuit 26. The RF circuit 26 supplies a reproduced signal to the binarizing circuit 34, and binarized data are supplied to the encoding/decoding circuit 36. The encoding/decoding circuit 36 decodes the modulated data and verifies the decoded data against the data recorded in the buffer memory 38. The result of verification is supplied to the system controller 32. In accordance with the result of verification, the system controller 32 determines whether data are subsequently recorded or switching is performed.

By means of such a configuration, the MSK modulation mark included in the wobble signal is detected on the basis of a wobble signal and a reference clock signal generated from the wobble signal in the PLL circuit.

Figure 2:
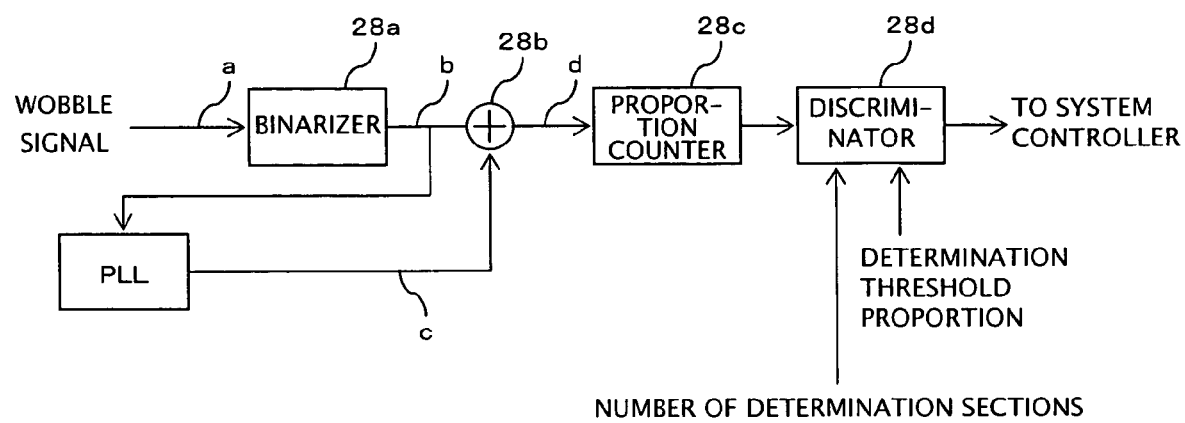
FIG. 2 is a block diagram showing the configuration of an MSK modulation mark detection circuit in an address decoding circuit.

FIG. 2 shows an MSK modulation mark detection circuit in the address decoding circuit 28. The MSK modulation mark detecting circuit comprises a binarizer 28a for binarizing a wobble signal extracted from an RF signal, an exclusive-OR (EOR) gate 28b, a proportion counter 28c, and a discriminator 28d. The exclusive-OR gate 28b performs exclusive-OR operation of the binarized wobble signal and the reference clock signal output from the PLL circuit. The proportion counter 28c measures a proportion of a Hi (high-level) pulse width of the exclusive-OR result acquired during a half period of the reference clock signal to the entire half period of the reference clock signal. The discriminator 28d compares the proportion measured by the proportion counter 28c with a determination threshold proportion, to thus determine whether the phase is 0 degree or 180 degrees; and supplies a result of determination to the system controller 32. Specifically, when the measured proportion is the determination threshold proportion or more, the result is standardized to data 1. In contrast, when the measured proportion is less than the determination threshold proportion, the result is standardized to data 0. The result of determination is supplied to the system controller 32. The determination threshold proportion determined by the discriminator 28d is adaptively set by the system controller 32. The exclusive-OR gate 28b is an example gate which compares the phase of the binarized wobble signal with the phase of the reference clock signal, and another arbitrary phase comparator can be employed.

Figure 3:
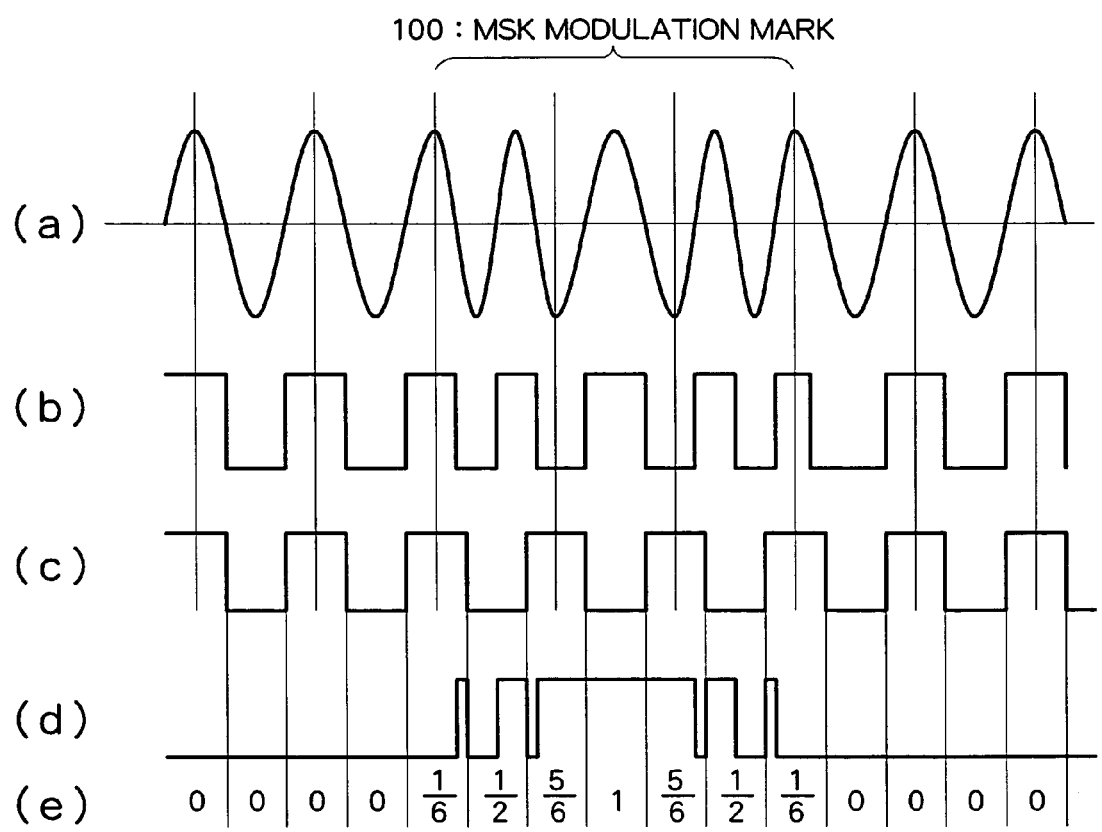
FIG. 3 is a timing chart showing signal waveforms of individual sections shown in FIG. 2.

FIG. 3 shows signal waveforms of individual sections shown in FIG. 2. FIG. 3A shows the waveform of an MSK-modulated wobble signal; namely, the waveform of a signal appearing in section "a" in FIG. 2. During the MSK modulation, frequency modulation is effected while one frequency is taken as being identical with that of a reference carrier signal and another frequency is taken as being 1.5 times the frequency of the reference carrier signal. The reference carrier signal is assumed to have a signal waveform of $\cos(\omega t)$, the MSK modulation mark is formed from a three-carrier period section having a signal waveform of $\cos(1.5\omega t)$, $-\cos(\omega t)$, and $-\cos(1.5\omega t)$. In the drawing, an MSK-modulated mark 100 is displayed in essentially the center of the wobble signal. FIG. 3B shows the waveform of a wobble signal binarized by the binarizer 28a; namely, the waveform of a signal appearing at section "b" in FIG. 2. FIG. 3C shows the waveform of a reference clock signal which is formed by the PLL circuit after the binarized wobble signal in FIG. 3B has been supplied to the PLL circuit; namely, the waveform of a signal appearing in section "c" in FIG. 2. FIG. 3D shows the waveform of a signal obtained by the exclusive-OR gate 28b as an exclusive-OR result of the binarized wobble signal and the reference clock signal; namely, the waveform of a signal appearing in section "d" in FIG. 2. When both the wobble signal and the reference clock signal are Hi (1) or Low (0), the waveform shown in FIG. 3D becomes Low (0). When either of the wobble signal and the reference clock signal is Hi (1), the waveform becomes Hi (1). In an area of the wobble signal where the MSK modulation mark 100 is present, the frequency of the signal is changed, and the phase of the signal is also inverted. Therefore, "1" or a Hi level arises in the exclusive-OR result. In the present embodiment, the proportion of the Hi level is utilized.

FIG. 3E shows a result of computation of a proportion at which the exclusive-OR result shown in FIG. 3D becomes a Hi level (1); more specifically, a proportion of the Hi level in the half period of the reference clock signal or the result of measurement performed by the proportion counter 28c shown in FIG. 2. In a section of the wobble signal other than the area of the MSK modulation mark 100, coincidence exists between the phase of the wobble signal and the phase of the reference clock signal. Hence, the proportion assumes a value of 0. Meanwhile, as mentioned previously, the wobble signal and the reference clock signal become out of phase with each other at the MSK modulation mark 100, so that the proportion is increased. The proportion becomes 1 (100%) in the section of the MSK modulation mark 100 where the phase is inverted. Specifically, the proportion becomes highest to 1 at the center of the MSK modulation mark 100. An infinite proportion, which is larger than 0 but smaller than one, is present in sections before and after the MSK modulation mark. Since the proportion includes noise, the discriminator 28d compares proportions of the respective sections supplied from the proportion counter 28c with the predetermined determination threshold proportion, to thus standardize, to one, the proportion which is larger than the predetermined determination threshold proportion.

For instance, the proportion computed by the proportion counter 28C is presumed to assume values of 0, 0, 0, 0, ⅙, ½, ⅚, 1, ⅚, ½, ⅙, 0, 0, 0, 0 in fifteen sections (see FIG. 3E). When the determination threshold proportion is assumed to be ½, the result of determination made by the discriminator 28d in the same 15 sections assumes values of 0, 0, 0, 0, 0, 1, 1, 1, 1, 1, 0, 0, 0, 0, 0. When the value of the proportion in each section is smaller than ½, the result of determination is standardized to 0. When the value of proportion is larger than ½, the result of determination is standardized to 1. Therefore, a proportion of ⅙ is standardized to 0; a proportion of ⅚ is standardized to 1; and a proportion of ½ is standardized to 1. Of these standardized proportions, a boundary between 0 and 1 denotes a boundary between a non-MSK modulation mark 100 and the MSK modulation mark 100. Since the MSK modulation mark 100 is formed from the 3-carrier period section, and hence the section—where the standardized proportion assumes a value of one—becomes a plurality of continuous sections. Consequently, the discriminator 28d determines whether or not there are continuously present at least predetermined sections where the standardized proportion assumes a value of one. When at least predetermined sections are continuously present, the sections are detected as the MSK modulation mark 100, and a detection signal is supplied to the system controller 32. The predetermined sections preferably correspond to three sections which are equal to the length of the MSK modulation mark 100. However, a section which is longer than the MSK modulation mark may also be acceptable; for example, four sections or five sections. The system controller 32 also provides the predetermined number of sections.

As is evident from FIG. 3, the phase of the reference clock signal changes from Hi, Low, Hi in the section where the proportion computed by the proportion counter 28c becomes one, and sections adjacent thereto. The section during which the phase of the clock signal is Low corresponds to the center of the MSK modulation mark 100. Hence, detection of center of the MSK modulation mark 100 as well as mere detection of the MSK modulation mark 100 can also be performed. Alternatively, in the section corresponding to the center of the standardized proportion, a determination is made as to whether or not the phase of the reference clock signal corresponds to a Low (−) state among phase changes of Hi, Low, and Hi (or polarity changes of +, −, +). When the phase corresponds to Low (−), the section can be reliably verified as being the MSK modulation mark 100.

In summary, the MSK modulation mark 100 can be detected without fail by means of the following detection algorithm.

(1) When there are continuously present predetermined sections or more where a proportion of the exclusive-OR result obtained in the half period of the reference clock signal becoming Hi (1) is equal to or greater than the predetermined determination threshold proportion, the continuous sections are detected as the MSK modulation mark 100.

(2) When the center section of the continuous sections corresponds to a Low section in the case where the phase or polarity of the reference clock signal changes from Hi-Low-Hi, the continuous sections are verified as the MSK modulation mark 100.

In the meantime, when crosstalk from the adjacent track is present in the wobble signal, the phase of the wobble signal is shifted, and hence the proportion computed by the proportion counter 28c can also be changed. Consequently, when the proportion has been standardized by use of a fixed determination threshold proportion, there is a potential risk of a failure to detect the MSK modulation mark 100 that should originally be present. Specifically, the amplitude of the wobble signal fluctuates under influence of crosstalk, whereby the binarized wobble signal is changed. The phase of the wobble signal is shifted under influence of crosstalk, whereby the proportion of the exclusive-OR result is changed. Therefore, the system controller 32 detects presence/absence of crosstalk. When crosstalk is present, the determination threshold proportion is adaptively adjusted. For instance, when crosstalk is present, the determination threshold proportion is reduced from ½ to ⅓ or ¼. Detecting the MSK modulation mark 100 becomes easy by reducing the threshold proportion. Further, the system controller 32 may change the number of determination sections according to the presence/absence of crosstalk. For instance, when crosstalk is present, the number of determination sections is increased from three to five and the like. Presence/absence of crosstalk can be detected from changes in the amplitude of the wobble signal or an envelope.

At the outset, the system controller 32 sets the determination threshold proportion and the number of sections to default values. When the MSK modulation mark 100 is not detected and when processing moves to retry processing, the influence of crosstalk is determined to exist, and at least one of the determination threshold proportion and the number of sections may be changed.

Moreover, when there is no influence of crosstalk, processing (1) is solely performed, to thus detect the MSK modulation mark 100. When influence of crosstalk is present, any of (1) and (2) may be carried out to thus detect the MSK modulation mark 100.

In the present embodiment, the MSK modulation mark 100 is detected. However, the present invention can also be applied to a modulation system using the MSK modulation scheme and the HMW scheme, as well as to only the MSK modulation scheme.

What is claimed is:

1. An optical disk apparatus for demodulating an address by detecting an MSK-modulated portion from an MSK-modulated wobble signal; the apparatus comprising:

reproduction means for reproducing the wobble signal;
binarization means for binarizing the wobble signal;
operation means for performing exclusive-OR operation of the binarized wobble signal and a reference clock signal;
extraction means for comparing a proportion of the exclusive-OR value achieved in a half period of the reference clock signal assuming a value of one with a predetermined threshold proportion, to thus extract continuous sections where the proportion becomes equal to or greater than the predetermined threshold proportion; and
detection means for detecting the continuous sections as the MSK-modulated portion when the continuous sections correspond to a predetermined number of sections or more.

2. The optical disk drive according to claim 1, further comprising:

means for changing at least either of the predetermined threshold proportion and the predetermined number of sections when crosstalk originating from an adjacent track is superimposed on the wobble signal.

3. The optical disk drive according to claim 1, further comprising:

means for verifying the MSK-modulated portion depending on whether or not a polarity of the reference clock signal achieved in center of the continuous sections is specific polarity.

4. The optical disk drive according to claim 2, wherein, when crosstalk is superimposed, the changing means changes the predetermined threshold proportion so as to be smaller or the predetermined number of sections so as to become increased.

5. An optical disk apparatus for detecting an MSK-modulated portion from an MSK-modulated wobble signal; the apparatus comprising:

reproduction means for reproducing the wobble signal;
phase comparison means for comparing the phase of the wobble signal with the phase of a reference clock signal;
extraction means for comparing, with a predetermined threshold proportion, a proportion of the wobble signal and the reference clock signal differing in phase from each other in a half period of the reference clock signal, to thus extract continuous sections where the proportion becomes equal to or greater than the predetermined threshold proportion; and
detection means for detecting the continuous sections as the MSK-modulated portion when the continuous sections correspond to a predetermined number of sections or more.

6. The optical disk apparatus according to claim 5, further comprising:

means for changing at least either of the predetermined threshold proportion and the predetermined number of sections when crosstalk originating from an adjacent track is superimposed on the wobble signal.

7. The optical disk drive according to claim 6, wherein, when crosstalk is superimposed, the changing means changes the predetermined threshold proportion so as to be smaller or the predetermined number of sections so as to become increased.

8. The optical disk drive according to claim 6, wherein the crosstalk is detected from fluctuations in the amplitude of the wobble signal.

9. The optical disk apparatus according to claim 5, further comprising:

means for changing at least either of the predetermined threshold proportion and the predetermined number of sections when the detection means does not detect the MSK-modulated portion.

10. The optical disk drive according to claim 9, wherein, when the MSK-modulated portion is not detected, the changing means changes the predetermined threshold proportion so as to be smaller or the predetermined number of sections so as to become increased.

11. The optical disk drive according to claim 5, further comprising:

means which, when crosstalk originating from an adjacent track is superimposed on the wobble signal, verifies the MSK-modulated portion detected by the detection means depending on whether or not a polarity of the reference clock signal achieved in the center of the continuous sections is a specific polarity.

* * * * *

UNITED STATES PATENT AND TRADEMARK OFFICE
CERTIFICATE OF CORRECTION

PATENT NO. : 7,599,262 B2 Page 1 of 1
APPLICATION NO. : 11/493462
DATED : October 6, 2009
INVENTOR(S) : Akira Mashimo It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 600 days.

Signed and Sealed this

Twenty-eighth Day of September, 2010

David J. Kappos
*Director of the United States Patent and Trademark Office*